US008775194B2

(12) United States Patent
Cummins

(10) Patent No.: US 8,775,194 B2
(45) Date of Patent: Jul. 8, 2014

(54) SYSTEM, METHOD, AND COMPUTER PROGRAM PRODUCT FOR CONTEXT-BASED BUSINESS PROCESS MANAGEMENT

(75) Inventor: Fred A. Cummins, Farmington Hills, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2056 days.

(21) Appl. No.: 11/246,599

(22) Filed: Oct. 7, 2005

(65) Prior Publication Data

US 2007/0083406 A1    Apr. 12, 2007

(51) Int. Cl.
*G06F 17/30*    (2006.01)
*G06Q 10/06*    (2012.01)

(52) U.S. Cl.
CPC .......... *G06Q 10/06* (2013.01); *G06Q 10/06375* (2013.01); *G06Q 10/063* (2013.01)
USPC ................... 705/1.1; 705/7; 705/74; 705/133

(58) Field of Classification Search
USPC .................................. 705/1, 74, 1.1; 707/133
See application file for complete search history.

(56) References Cited

U.S. PATENT DOCUMENTS

| | | | |
|---|---|---|---|
| 6,003,046 A | 12/1999 | Nielsen | |
| 6,154,751 A | 11/2000 | Ault et al. | |
| 6,167,409 A | 12/2000 | DeRose et al. | |
| 6,546,406 B1 | 4/2003 | DeRose et al. | |
| 2001/0051876 A1* | 12/2001 | Seigel et al. | 705/1 |
| 2003/0158839 A1 | 8/2003 | Faybishenko et al. | |
| 2006/0190310 A1* | 8/2006 | Gudla et al. | 705/7 |

OTHER PUBLICATIONS

Notification Concerning Transmittal of International Preliminary Report on Patentability from PCT Application No. PCT/US2006/034858 dated Apr. 17, 2008.
Written Opinion of the International Searching Authority from PCT Application No. PCT/US2006/034858 dated Aug. 28, 2007.
The Java Servlet API White Paper; http://web.archive.org/web/20000125210050/http://java.sun.com/products/servlet/whitepaper (Mar. 2005) (14 pgs.).
Javaserver Pages White Paper: Comparing Methods for Server-Side by Dynamic Content White Paper, Jan. 2000; http://web.archive.org/web/20000818052737/http://www.java.sun.com/products/jsp/jspservlet . . . (8 pgs).
Javaserver Pages White Paper: Servlet Developer White Paper, Nov. 1999 http://web.archive. org/web/20000601094518/http://www.java.sun.com/products/jsp/jsp-developerw.. (3 pgs).
Javaserver Pages White Paper: Developing Web-based Applications: A Background (Sep. 1999) http://web.archive.org/web/19991009031153/http://www.java.sun.com/products/jsp/whitepaper.html. (10 pgs).

* cited by examiner

*Primary Examiner* — Candice D Wilson
*Assistant Examiner* — Kimberly Evans

(57) ABSTRACT

A method, and corresponding hardware and software implementations, including receiving a client login from a client user; loading contextual information including at least one contextual parameter; determining a business process according to the contextual information; and executing the business process.

21 Claims, 4 Drawing Sheets

SYSTEM, METHOD, AND COMPUTER PROGRAM PRODUCT FOR CONTEXT-BASED BUSINESS PROCESS MANAGEMENT

TECHNICAL FIELD OF THE INVENTION

The present invention is directed, in general, to data processing system business process management.

BACKGROUND OF THE INVENTION

Business processes often vary depending on the context in which they are applied. In particular, they may vary based on country, product brand, organization, or other contextual factors. Traditionally, business processes were tailored by local organizations to address requirements of their situation. With the advent of globalization and automation of business processes, enterprises may execute business processes centrally for business units located around the world. In addition, business process outsourcing services may perform business processes for many different clients with variations required among the different clients.

In current business process implementations, however, these required variations cannot be effectively accommodated while maintaining the advantages of central location and deployment of the business processes. There is, therefore, a need in the art for an improved system, method, and computer program product for context-based business process management.

SUMMARY OF THE INVENTION

To address the above-discussed deficiencies of the prior art, it is a primary object of the present invention to provide a system, method, and computer program product for context-based business process management, in which business processes can be automatically adapted to the context in which they are used or implemented.

According to various embodiments, there is disclosed a method, and corresponding hardware and software implementations, comprising receiving a client login from a client user; loading contextual information including at least one contextual parameter; determining a business process according to the contextual information; and executing the business process.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Various embodiments include a system, method, and computer program product for context-based business process management, in which business processes can be automatically adapted to the context in which they are used or implemented.

To provide context for the system and methods disclosed herein, both a hardware context and overall system context are described below. Following that is a more detailed description of the specific functions, structures, and other details of the disclosed embodiments.

Figure 1:
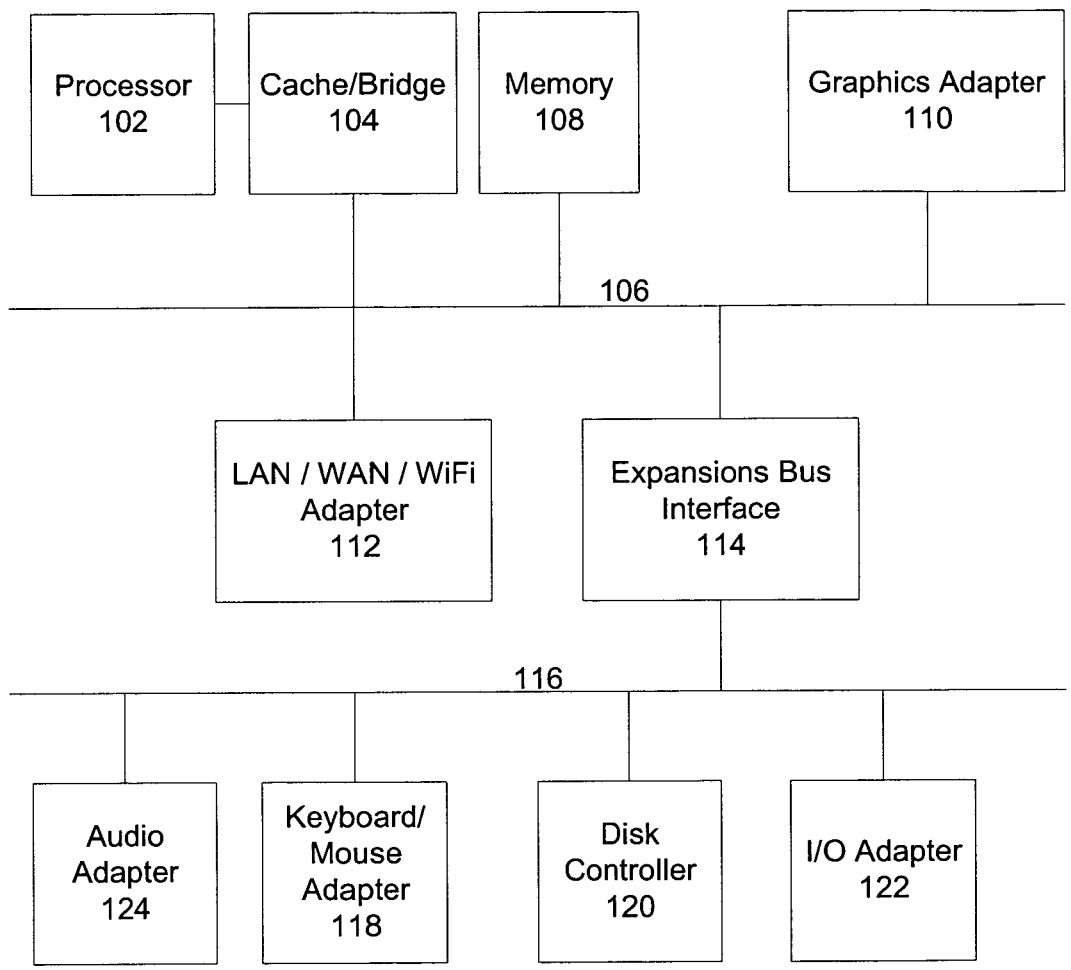
FIG. 1 depicts a block diagram of a data processing system in which a preferred embodiment can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary in particular details. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. An application may also have different views of the same instance. In this case, the different views could be the same process in different contexts. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed, and can be suitably modified. The operating system is modified or created as necessary in accordance with the present invention as described.

Figure 2:
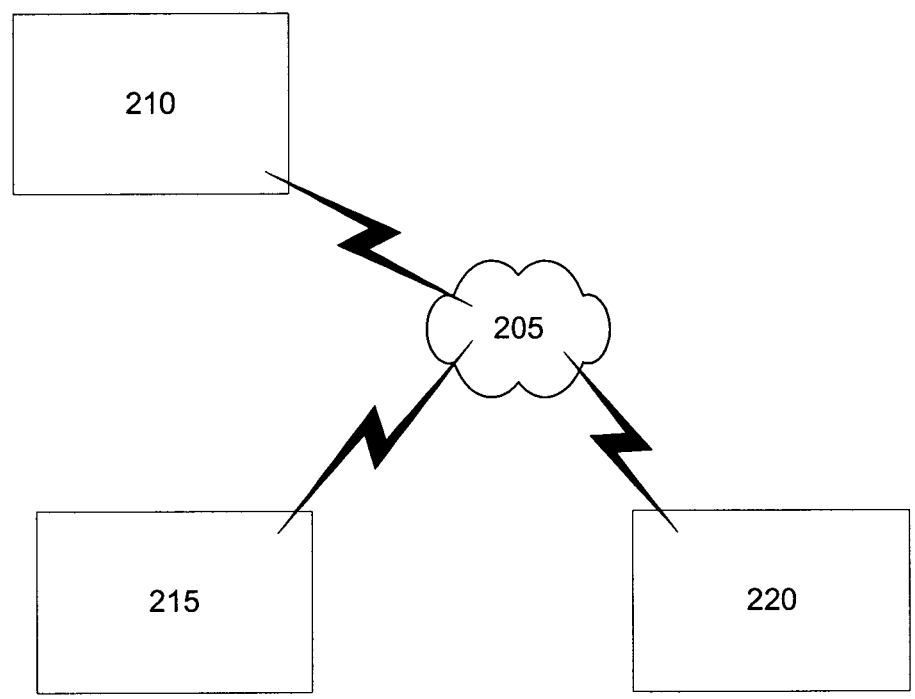
FIG. 2 depicts a block diagram of a data processing system network in which an embodiment of the present invention can be implemented.

FIG. 2 depicts a block diagram of a data processing system network in which an embodiment of the present invention can be implemented. In this figure, network 205 is any known type of computer network, including private networks or public networks such as the internet. While network 205 is shown in only one instance here; as known to those of skill in the art, network 205 can be implemented in multiple separate networks, or in the same public or private network system. Of course, any data or network communication described herein can be implemented using any known data communications means, such as via telephone modem, xDSL, fiber optic, wireless, etc., or public or private networks. These communications can include data business services, context information, and other related and unrelated data.

Server 210 is shown communicating with client systems 215/220 via network 205. Server system 210 is a data processing system server, configured to communicate with multiple different client systems, including client systems 215/220 and others.

It is understood that client systems 215/220 and server system 210 may be co-located or placed at different locations, or be otherwise structured as known to those of skill in the art, so long as they are capable of together performing the functions described and claimed herein.

As described herein, one or more of the data processing systems depicted in FIG. 2, whether client or server systems, can be configured to execute a business process locally, deliver a business process to a remote system, or to interact with a business process hosted and operating on a remote system.

The communications between systems can be made in any known fashion, and in one embodiment, utilize standard markup-language communications, as known to those of skill in the art.

Preferred embodiments include a system, method, and computer program product for customizing business-process operation according to specific context data. Various disclosed embodiments incorporate context data that include, but are not limited to, some or all of ten contextual parameters for the definition of contexts for business processes: Country, Time Zone, Currency, Language, Company, Operational Entity, Brand, Channel, and Role. Other implementations can use any number of different contextual parameters.

A preferred embodiment includes a process definition in which each activity of a business process can perform alternative actions depending on the context of the particular execution. The process definition preferably includes both a definition of the action to be taken depending on the value of one or more contextual parameters, as well as the default action or actions to be taken if none of the contextual parameters includes a value for which an action is defined or if some other error results.

In various embodiments, a process may be invoked by a human or another process. The context can come from a user's profile, the initiating request or event, or the calling process, including something added as a result of the actions of the calling process. In some embodiments, everything about a request (i.e., its parameters/content) are the context of a request.

Wherever there is an alternative activity or set of activities (a process), the context parameters and values that qualify for that alternative are preferably declared and applied at the point of selection at execution time. From the caller's perspective, it is one process. One implementation (that is somewhat restrictive) would be to determine all of the qualified activities when the process is instantiated (initiated). A more general implementation would determine each activity appropriate to the context at the time that activity is to be executed.

Figure 3:
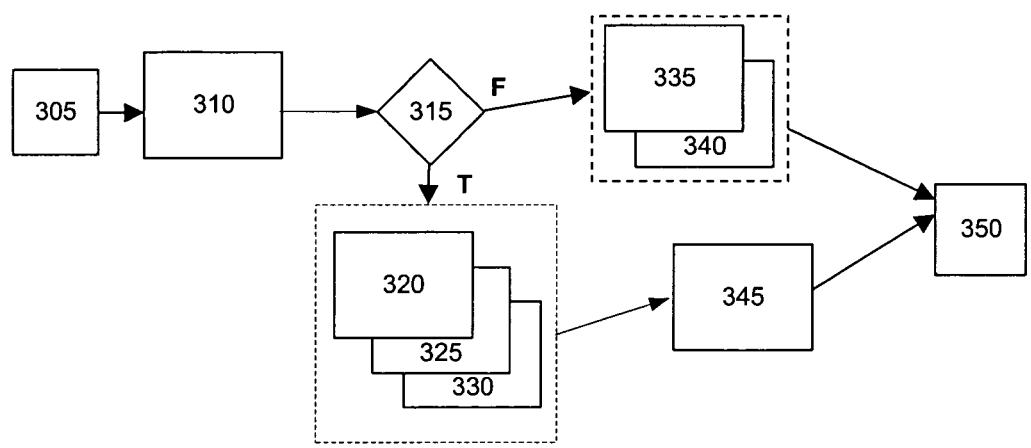
FIG. 3 depicts an exemplary block diagram illustrating alternate actions in the operation of a business process, in accordance with an embodiment of the present invention.

FIG. 3 depicts an exemplary block diagram illustrating alternate actions in the operation of a business process. In this example, it is assumed that the contextual parameters have already been determined. For example, where geographically diverse clients access business services that are hosted on a common server, each client can have one or more contextual parameters assigned based on the client location. When the client "logs in" to his account on the common server, the system will automatically retrieve contextual parameters related to that client, such as Country, Time Zone, Currency, Language, Company, Operational Entity, Brand, Channel, and Role. These contextual parameters are retained throughout the client's session, and each process can preferably access the parameters and use them to customize the process flow, to customize the display to the client user, and for other purposes as will be recognized by those of skill in the art.

Preferably, the designer of the process determines which elements are to be considered the context parameters for the particular process. The choice of context parameters allows the designer to view the process and design it "in that context" without the necessity of considering all other contexts at the same time. The context, or certain context parameters, may also be a way of restricting what a particular designer is allowed to change in a process as where a common process is specialized for different users.

In an implementation in accordance with a preferred embodiment, there is a distinction between the process during design and the same process during execution. In design, the designer can set the context variables and see the resulting process. At runtime (execution) the context parameters may not all be known at the outset. Setting of context parameters within the process may result in a more complex process, or one that is at greater risk of error, since the designer must ensure that context parameters are set before they are needed.

While it is possible, in some embodiments, to determine all of the activities of a process for a given context at the start, it is also possible that the process will determine or change parameters that are context for some of its activities as well as other processes it may invoke. A designer can set all of these for viewing and designing a particular specialization, but that does not mean they are all known at the start of execution of a particular process.

The exemplary process of FIG. 3 begins at node 305 and initiates activity 310. There is only one version of this activity.

When activity 310 is complete, processing proceeds to activity 315, which is a decision point. There could be alternative versions of the decision based on the context, but in this example, there is only one. If the decision is true (T), then processing proceeds to the alternative activities 320, 325, and 330. This decision could be, for example, whether the "Country" contextual parameter is equal to "United States".

As noted, while this decision is illustrated as a simple true/false, for simplicity of illustration, in practice there can be any number of different process paths depending in the values of the contextual parameters, as defined by the process definitions.

Attributes defined on alternative activities 320, 325, and 330 will determine which one is appropriate for the particular context. When alternative activity 320, 325, or 330 is completed, processing proceeds to activity 345 and then the process is completed at 350.

Alternatively, if decision 315 is false (F), processing proceeds to 335 or 340, depending on the context values, and then the process is complete at 350.

As shown, the process path can change significantly depending on the context of the client user, as defined by the contextual parameters. In this way, a common system can provide the customized experience and processing required by different client users, gaining the advantages of a centralized implementation while providing the client with the advantages of a customized solution.

One approach implementing this process model is to introduce a selection specification ahead of each activity where there are alternatives. In this way, the selection of alternatives could be based on any variables associated with the process execution.

Another approach is to define a set of context parameters for the entire process and base the selection of alternative activities on the values of one or more of the variables. This has the advantage that the modeling tool can be programmed to display only the activities that would be relevant to a selected context, allowing the analyst to view and refine the complete process in each alternative context.

In addition, an implementation can define the alternative activities in a hierarchy where one is the default, and others are more specific. The hierarchy can be implicit by always selecting the activity with the most restrictive scope, i.e., the most specific but relevant activity. Alternatively, the selection can be explicitly defined using a decision tree or with a truth table or Venn diagram that identifies the appropriate alternative for every possible combination of context variable values.

Some activities can be defined as "no-operation" thus eliminating the activity for its associated contexts. If a no-op were defined as the default, then only activities for specialized contexts would be active at that point in the process.

In alternate embodiments, different business processes could be defined for each different context. This approach could result in a proliferation of business processes, and a substantial burden to appropriately change all of the similar processes when a common business requirement changes. In addition, a context-based invocation decision would be required at each point of invocation of such alternative processes.

Figure 4:
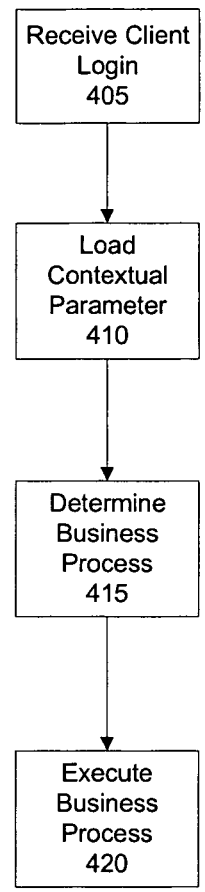
FIG. 4 depicts a flowchart of a process in accordance with a preferred embodiment.

FIG. 4 depicts a flowchart of a process in accordance with a preferred embodiment. Suitable means in a data processing system can implement the process, and computer-executable instructions to perform the process can be stored in a machine-usable medium.

First, the system receives a client login (step 405). As known to those of skill in the art, the login can identify a client enterprise, and individual, or other identifying information about the client user. In a preferred embodiment, the business processes described herein are executed on a server data processing system, and the client user logs in through a client data processing system communicating with the server data processing system. Of course, the client login need not be done at the same time as the remaining steps, and may not include a specific user manually logging into a system. For example, a client data processing system that is substantially continuously communicating with a server data processing system can be considered to have "logged in" at the time it attaches to and is authenticated by the server data processing system.

Other conventional steps, known to those of skill in the art, are not illustrated in this figure. These steps can include loading and assigning client profiles, allocating resources, and many others.

Next, the system will load at least one contextual parameter (step 410). One or more contextual parameter comprises "contextual information" as used herein. Preferably, the contextual parameter corresponds to the client login, and can be loaded when the login is processed. In alternate embodiments, the client user can be prompted to enter information, and the contextual information can be received directly from the client user. In other embodiments, the contextual data can be detected automatically, such as from the IP address of the client user or in other ways known to those of skill in the art.

Next, the system will determine a business process according the contextual parameter(s) (step 415). The business process is preferably selected from among a plurality of options, each being conditional on one or more of the contextual parameters. Preferably, there is also a default business process defined for when other conditions are not met. The business process can be defined as a "no operation" as a default or according to specific contextual parameter conditions.

The system will execute the appropriate business process (step 420), as determined. This execution can include a no operation (that is, nothing is affirmatively executed at this point), and can include providing the user with options, according to the contextual parameters, for further processes.

In a typical implementation, a series of business processes are executed as described, according to user actions, the contextual parameters, and other factors as known to those of skill in the art. Together, this series of processes forms a process path. Each process in the process path can be the only available process at that point, or can be one of a plurality of alternative processes, determined as described above. By using the processes and techniques described herein, the process path and overall experience are then customized to the specific client user according to the client user's preferences and context of use.

Preferably, from the perspective of a client user, the client initiates a process, and the execution of the process determines the set of activities that will actually be used in the performance of that request. From the client's view, there is only one process, discussed above as the "process path", and the context-based selection is internal to the process from the client's perspective.

In many implementations, the first process in a process path, after a client login, will not have alternative processes, and are omitted from the exemplary process illustrated in the flowchart above. There may be a first process that sets context parameters, or there may not, according to design preferences. The determination of context parameters can be in the execution engine, as in a preferred embodiment, and performed as part of initiating a process, or the process itself may determine context parameters.

In various embodiments, it is possible to restrict certain context variables so they cannot be changed by a designer or during execution. By doing so, the same root processes can be used by multiple clients in an outsourcing arrangement, to gain economies of scale across multiple clients while preserving the separation of processing and control of each from the others.

Other particular innovative features include, but are not limited to, the including ability of the system to display a view a process in a specified context, the ability of the system to restrict a designer or a client user to particular context(s) in order to ensure separation of clients where a system uses the same processes to serve multiple, independent clients, and the ability of the system to have context applied as each activity is executed for selection of alternatives as opposed to activities being determined at the beginning of the process (instance).

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of the data processing system may conform to any of the various current implementations and practices known in the art.

It is important to note that while the present invention has been described in the context of a fully functional system, those skilled in the art will appreciate that at least portions of the mechanism of the present invention are capable of being distributed in the form of instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for managing business processes, comprising:
receiving a client login from a corresponding client user in a data processing system;
loading contextual information including at least one contextual parameter associated with the client login, wherein the data processing system is configured to accept contextual information from a plurality of client logins;
determining, by the data processing system, a customizable business process for the client user, the customizable business process including activities wherein each activity of the customizable business process performs an action selected from a plurality of alternative actions according to the contextual information;
customizing the activities of the customizable business process according to a process definition to generate a version of the customizable business process corresponding with the process definition, the process definition including both a definition of an action to be taken depending on the at least one contextual parameter associated with the client login and a default action to be taken if none of the contextual parameters includes a value for which an action is defined;
executing the version of the customizable business process by the data processing system; and
permitting the determining of the customizable business process for the client user based on the at least one contextual parameter while the version of the customizable business process is executing.

2. The method of claim 1, wherein the contextual information corresponds to the client login.

3. The method of claim 1, wherein the contextual information is received from the client user.

4. The method of claim 1, wherein the contextual information is automatically determined.

5. The method of claim 1, wherein the contextual information includes one or more contextual parameters selected from the group consisting of Country, Time Zone, Currency, Language, Company, Operational Entity, Brand, Channel, and Role.

6. The method of claim 1, wherein the business process is determined from a plurality of alternative business processes, each alternative business process being associated at least one contextual parameter.

7. The method of claim 1, wherein the business process is executed in conjunction with at least one other business process, together defining a process path, the process path being customized according to the contextual information.

8. A data processing system comprising a processor and accessible memory, the data processing system configured to perform the steps of:
receiving a client login from a corresponding client user;
loading contextual information including at least one contextual parameter associated with the client login, wherein the data processing system is configured to accept contextual information from a plurality of client logins;

determining a customizable business process for the client user, the customizable business process including activities wherein each activity of the customizable business process performs an action selected from a plurality of alternative actions according to the contextual information;

customizing the activities of the customizable business process according to a process definition to generate a version of the customizable business process corresponding with the process definition, the process definition including both a definition of an action to be taken depending on the at least one contextual parameter associated with the login and a default action to be taken if none of the contextual parameters includes a value for which an action is defined;

executing the version of the customizable business process; and permitting the determining of the customizable business process for the client user based on the at least one contextual parameter while the version of the customizable business process is executing.

9. The data processing system of claim 8, wherein the contextual information corresponds to the client login.

10. The data processing system of claim 8, wherein the contextual information is received from the client user.

11. The data processing system of claim 8, wherein the contextual information is automatically determined.

12. The data processing system of claim 8, wherein the contextual information includes one or more contextual parameters selected from the group consisting of Country, Time Zone, Currency, Language, Company, Operational Entity, Brand, Channel, and Role.

13. The data processing system of claim 8, wherein the business process is determined from a plurality of alternative business processes, each alternative business process being associated at least one contextual parameter.

14. The data processing system of claim 8, wherein the business process is executed in conjunction with at least one other business process, together defining a process path, the process path being customized according to the contextual information.

15. A computer program product tangibly embodied in a machine-readable medium, comprising:

computer-executable instructions for receiving a client login from a corresponding client user;

computer-executable instructions for loading contextual information including at least one contextual parameter associated with the client login, wherein the data processing system is configured to accept contextual information from a plurality of client logins;

computer-executable instructions for determining a customizable business process for the client user, the customizable business process including activities wherein each activity of the customizable business process performs an action selected from a plurality of alternative actions according to the contextual information;

computer executable instructions for customizing the activities of the customizable business process according to a process definition to generate a version of the customizable business process corresponding with the process definition, the process definition including both a definition of an action to be taken depending on the at least one contextual parameter and a default action to be taken if none of the contextual parameters includes a value for which an action is defined; and computer-executable instructions for executing the version of the customizable business process; and computer-executable instructions permitting the determining of the customizable business process for the client user based on the at least one contextual parameter while the version of the customizable business process is executing.

16. The computer program product of claim 15, wherein the contextual information corresponds to the client login.

17. The computer program product of claim 15, wherein the contextual information is received from the client user.

18. The computer program product of claim 15, wherein the contextual information is automatically determined.

19. The computer program product of claim 15, wherein the contextual information includes one or more contextual parameters selected from the group consisting of Country, Time Zone, Currency, Language, Company, Operational Entity, Brand, Channel, and Role.

20. The computer program product of claim 15, wherein the business process is determined from a plurality of alternative business processes, each alternative business process being associated at least one contextual parameter.

21. The computer program product of claim 15, wherein the business process is executed in conjunction with at least one other business process, together defining a process path, the process path being customized according to the contextual information.

* * * * *